No. 748,019. Patented December 29, 1903.

UNITED STATES PATENT OFFICE.

CARL RUBITSCHUNG, OF FRANKFORT-ON-THE-MAIN, GERMANY.

MANUFACTURE OF ARTIFICIAL ASPHALT, STONE, &c.

SPECIFICATION forming part of Letters Patent No. 748,019, dated December 29, 1903.

Application filed May 8, 1903. Serial No. 156,282. (No specimens.)

*To all whom it may concern:*

Be it known that I, CARL RUBITSCHUNG, a subject of the German Emperor, residing at Frankfort-on-the-Main, Germany, have invented certain new and useful Improvements in the Manufacture of Artificial Asphalt, Stone, or the Like, of which the following is a specification.

This invention relates to a process for the manufacture from divided stony material or the like of a dry granular transportable material suitable for use in the manner of stamped asphalt for paving roadways or for making artificial stone or moldings of artificial stone.

The essential feature of the invention is the fact that the desired hot material is not molded and formed into bricks while still hot, but, on the contrary, prevented from coagulating and converted into a dry transportable granular mass, which can be subsequently reheated and pressed into artificial stone blocks or other bodies or used for road-paving in the manner of stamped asphalt.

The thin liquid tar which is rendered free from water and only slightly thickened by moderate heat, in no case above 200°, is mixed for a short time with divided stony material, more particularly gravel, the mixture being thoroughly stirred and the proportion, by weight, of the stony material being several (times five to ten times) that of the tar. The mixing is only continued until the mixture is complete, when it will no longer stain on being touched and will feel like dry mortar. This can either be performed by bringing the mixed material while stirring it to the temperature referred to and maintaining the latter for a short time or the stone and the tar can both be separately heated and then subjected for a short time to the necessary stirring or working up together until the mixture has reached the condition described. In this condition the material possesses exceptionally great binding power, so that in cooling it becomes converted into hard solid masses. The latter are produced without considerable external pressure—in fact, solely by the pressure of the weight of the mass itself if the material is allowed to cool in this condition. It was therefore hitherto impossible to allow the material to cool for subsequent use for road-paving or for molding, especially in a different locality. It has hitherto always been subjected to further treatment by molding and pressing while hot, and therefore still plastic. It has been found that the production of uniform material in this manner is very difficult and in many cases it is desirable to give the material the desired shape at the spot where it is to be used. In view of the uneven cooling and the above-mentioned property of the material the use thereof in a hot condition is inconvenient.

The object of the new process is to obtain a portable product capable of cohesion which can be used for the desired purpose of manufacture at any time and at any distance from the place where it was made. In this process the separate heating of the two materials is used, since by this means both are previously rendered anhydrous and their action on each other during the mixing can be considerably shortened.

During the mixing the stone absorbs the tar into its pores with avidity, more particularly if the stone is hotter than the tar, and it also becomes coated with a close and fine skin of tar, which subsequently cements the particles together. As soon as the mixture is practically dry to the touch the mixing operation is complete. Instead of placing this hot material in molds or pressing it it is powerfully cooled while leaving the mixing apparatus in a loose condition and is prevented from caking together. It can, for instance, be caused to fall from a considerable height through cold air onto a wide-meshed shaking sieve or several such sieves or the like, so that it is collected in a more or less finely divided granular form, possibly containing small lumps. Large lumps which remain on the sieves can subsequently be mechanically broken up and mixed with the mass.

The larger the proportion of stone material to tar the more surely is the formation of lumps prevented. This fact leads to a modification of the process, which consists in mixing with the stony material a quantity of thin liquid tar, which is insufficient for the necessary binding. In this case a small percentage of a pulverized binding agent dry when it is cold—for instance, pitch—is subsequently added to the mass. Pitch for this purpose is preferably prepared by distilling tar to a less extent than is usually done where pitch is the residue from complete distillation. The distillation should only be continued until a sample of the original tar has no longer the staining properties of tar and congeals on cooling. This pitch can be ground to a powder and is suitable for the purpose described. When subsequently reheated, the pulverized pitch in the mixture melts and assists the binding action of the tar, so that the cohesion becomes sufficient. After reheating, the product can be molded into articles—such as paving-stones, slabs, pipes, and the like—or used in the manner of stamped asphalt for paving roadways.

It is obvious that with the process described the addition of sawdust is also admissible and may be of advantage for the purpose in view.

I claim—

1. A process for the production of a substance for use in the manufacture of artificial asphalt, stone, and the like, consisting in separately heating tar and divided stony material, mixing the same, powerfully cooling the mixture before congelation and then converting same into a dry transportable granular mass, substantially as described.

2. A process for the production of a substance for use in the manufacture of artificial asphalt, stone, and the like, consisting in separately heating tar, and divided stony material, mixing said stony material with the tar, the latter in a quantity insufficient for cohesion, powerfully cooling the mixture before congelation, then converting same into a dry transportable granular mass, and subsequently adding a pulverized dry binding agent substantially as described.

In witness whereof I have signed this specification in the presence of two witnesses.

CARL RUBITSCHUNG.

Witnesses:
JEAN GRUND,
CARL GRUND.